B. L. BEEBE.
APPLICATION OF POWER.
APPLICATION FILED JULY 8, 1919.

1,348,202.

Patented Aug. 3, 1920.

INVENTOR.
Byron L. Beebe
BY
U.G. Charles
ATTORNEY.

UNITED STATES PATENT OFFICE.

BYRON L. BEEBE, OF WELLINGTON, KANSAS.

APPLICATION OF POWER.

1,348,202.  Specification of Letters Patent.  Patented Aug. 3, 1920.

Application filed July 8, 1919. Serial No. 309,271.

*To all whom it may concern:*

Be it known that I, BYRON L. BEEBE, a citizen of the United States, and a resident of Wellington, in the county of Sumner and State of Kansas, have invented certain new and useful Improvements in the Application of Power, of which the following is a specification, referring to the accompanying drawings.

The object of my invention is to construct a wheel adapted to revolve on an eccentric member which is adjustable, for the purpose of reducing the radius from the power driven center, and to carry the weight and power thrust of the engine on either side of the vertical axis of the wheel.

I also claim a wheel driven by a toothed or cogged member so constructed as to engage with internal bearings in the wheel proper and both wheel and toothed member revolve equally, and said member being rigidly attached to the power driven shaft I make it possible to shift the outer rim or wheel proper by an eccentric member having its bearings on said shaft thereby reducing the radius of the applied power.

I attain these objects by engaging a plurality of members as shown and described in the accompanying drawings.

Figure 1:
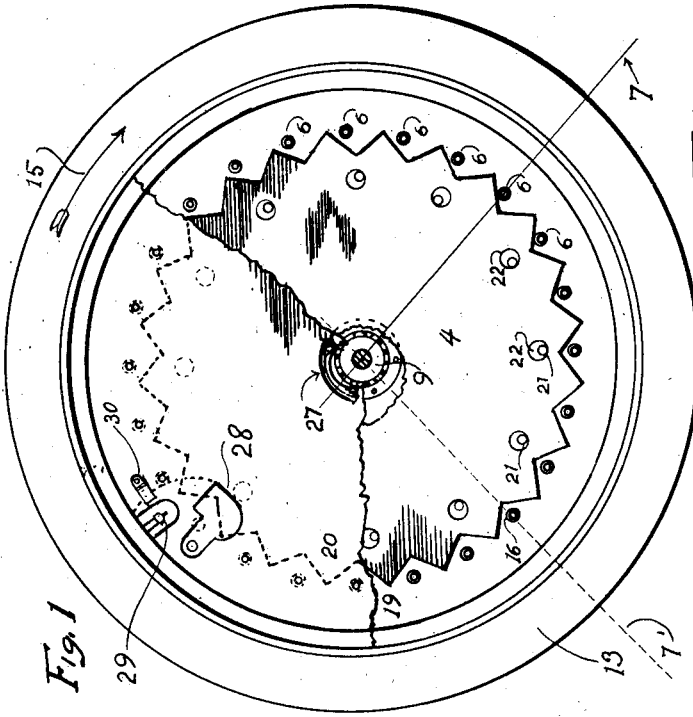
Figure 2:
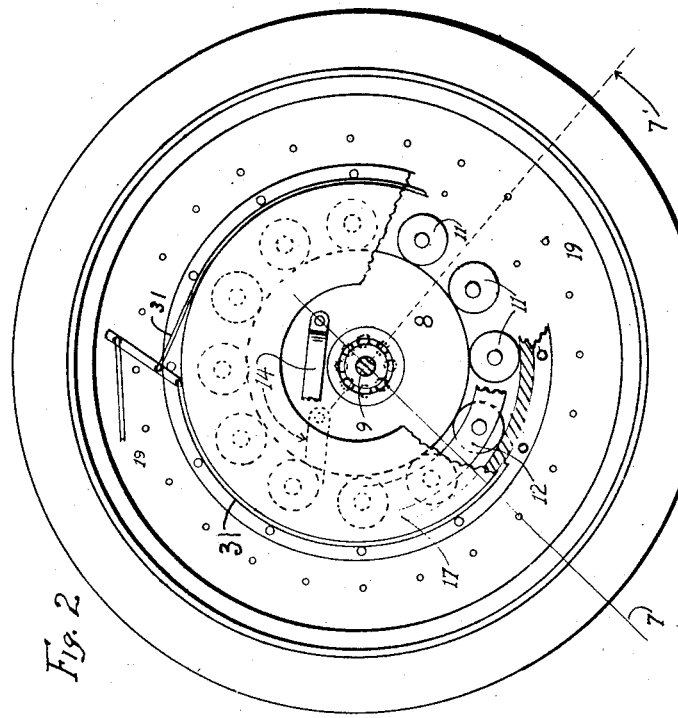
Figure 3:
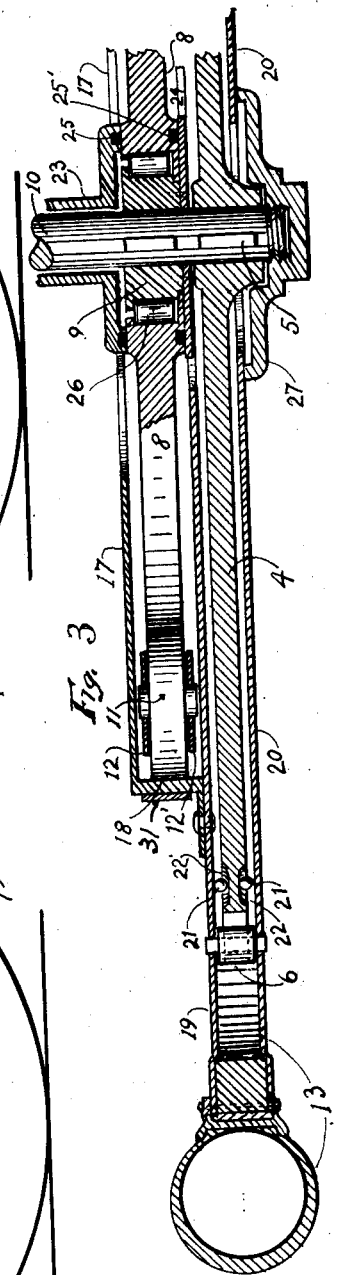

Figure 1 is an outside view of the drive wheel of an automobile or other power driven machine, with parts removed for convenience of illustration. Fig. 2 is the inside view of the wheel, parts removed for convenience of illustration. Fig. 3 is an enlarged sectional view of the wheel.

My invention has relation to any kind of power driven machine mounted on wheels adapted to rotate and carrying and pulling a load along the road or in the field.

In the drawings, a wheel 4 is mounted on a drive shaft 10, being keyed thereto at 5. The rim of the wheel 4 is constituted as a series of V-shaped teeth. A hub 9 is rigidly keyed to the drive shaft 10, intermediate the wheel 4 and the shaft housing 23. A series of roller bearings 26 are shown arranged around the periphery of the hub 9. It will be seen that the wheel 4 and the hub 9 are adapted to travel in a forward or reverse direction dependent upon the direction of travel of the drive shaft 10.

An eccentric disk bearing 8 is mounted around the roller bearings 26; this disk 8 does not rotate with the hub 9 but is adapted to oscillate thereupon. A shifting bar 14, Fig. 2, is pivotally mounted on the side of the bearing 8 and is of sufficient length to extend forward to and be operated by the driver of the car or machine. The end pivot of the bar 14 standing in the line 7 produced through the shaft 10, may be shifted until it stands in the line 7' produced through the shaft 10.

It will be understood that the maximum engine power for reverse movement of the car will be developed when the bar 14 has shifted in the direction of the arrow to the dotted position outlined, thereby oscillating the eccentric bearing 8 to the then axis of the eccentric, the line 7'; the maximum engine power for forward movement of the car will be developed when the eccentric disk bearing 8 stands as in Fig. 2 along the line 7. It will be further understood that this oscillation between the lines 7 and 7' represents the maximum movement of the eccentric and that it may be stopped at any intervening position and there rigidly held, by means of the bar 14. A hub covering 24 is rigidly attached to the hub 9. Packings 25 between the housing 23 and bearing 8 and packings 25' between the covering 24 and bearing 8 are employed to retain oil within the bearing.

The V-toothed wheel 4 is inclosed within the walls 19 and 20 of the wheel 13 of the car or machine. It will be noted in Fig. 3 that the walls 19 and 20 of the wheel 13 are not attached to the shaft 10. A hub cap 27 is mounted on the shaft 10. A covering 28 is pivotally mounted in a wall of the wheel 13 so that an air hose may be admitted to inflate the tire of the wheel through the valve 29 when necessary; a bracket 30 attached to said wall secures the covering 28 when in a closed position.

A plurality of rollers 11 are arranged at spaced intervals around the periphery of the eccentric disk 8, being pivotally mounted in rings 12 and 12' as shown in the Figs. 2 and 3. A brake drum 17 incloses the rollers 11 and disk 8 and is rigidly fastened to the wall 19 of the wheel 13. The rollers 11 bear against the inner rim face of the drum 17 at 18; the wheel 13 is therefore adapted to revolve around the disk bearing 8 upon the rollers 11. The wheel 13 therefore does not rotate concentrically with the wheel 4. At 31 a brake band is shown engaging the brake drum 17.

Ball bearings 21 and 21' seated in receptacles 22 and 22' in the wheel 4, preserve the alinement of the wheel 13, prevent side friction and overcome friction when the outer portion of the wheel is shifted by the eccentric. Rollers 6 housed on pins in the walls 19 and 20 of the wheel 13 are arranged at spaced intervals in a circle equidistantly from the rim of the wheel 13. The rollers 6 correspond in number to the teeth on the wheel 4; when the shaft 10 revolves in a forward direction as indicated by the arrow 15, Fig. 1 and the eccentric bearing 8 has been shifted by the bar 14 so that the line 7 is the axis of the eccentric, then the V-shaped teeth of the wheel 4 rotating in a circle concentric with the shaft 10, tend each in their turn to bear against and drive their respective rollers 6 which are brought successively in contact due to the eccentric rotation of the drum 17 carrying the wheel 13, upon the eccentric and rigidly positioned disk 8.

Thus in Fig. 1, a tooth of the wheel 4 bears against the roller 6 on the axis of the eccentric for forward movement, the line 7. All the other teeth and rollers are out of contact, but each set in their turn will, contact and drive the wheel 13 as they cross the axis 7. When it is desired to travel or rotate the wheel 13 in the opposite direction, the bar 14 is shifted to change the axis of the eccentric to the line 7'. The shaft 10 traveling in a reverse direction, the teeth will likewise approach their rollers from the reverse direction and will at 16 contact and drive as the elements approach the axis 7'.

Such modifications may be employed as lie within the scope of the appended claims.

Having fully described my invention what I now claim as new and desire to secure by Letters Patent is:

1. In combination, a revoluble shaft, a toothed wheel and a hub rigidly carried thereby; an eccentric disk rotatably mounted upon said hub and means for controlling and fixing the position of said disk; an outer wheel enveloping the toothed wheel, a drum rigidly attached to said outer wheel; roller members arranged intermediate the inner face of said drum and the eccentric disk; a plurality of roller members arranged in said outer wheel, one for each tooth of said toothed wheel, all substantially as specified and for the purposes set forth.

2. In combination, an axle shaft, a toothed wheel and a hub rigidly mounted thereon; an eccentric disk rotatably mounted upon said hub and means for controlling and fixing the position of said disk; an outer wheel enveloping the toothed wheel, a drum rigidly attached thereto, roller members arranged intermediate the inner face of said drum and the eccentric disk; a plurality of roller members arranged in the outer wheel, one roller for each tooth of said toothed wheel; rotation of said axle shaft occasioning rotation of the toothed wheel concentrically therewith so that each tooth will successively be brought into a position of contact with its roller on the eccentrically mounted outer wheel and exert driving pressure thereupon for the purposes and in the manner as substantially set forth.

BYRON L. BEEBE.

Witnesses:
NELLIE D. WILBUR,
W. A. NETHERIOT.